United States Patent [19]

Pfister

[11] Patent Number: 4,966,245
[45] Date of Patent: Oct. 30, 1990

[54] MOTOR VEHICLE HAVING A COVERING PART

[75] Inventor: Klaus Pfister, Wiernsheim, Fed. Rep. of Germany

[73] Assignee: Dr. Ing. H.c.F. Porsche Aktiengesellschaft, Fed. Rep. of Germany

[21] Appl. No.: 338,237

[22] Filed: Apr. 14, 1989

[30] Foreign Application Priority Data

Apr. 14, 1988 [DE] Fed. Rep. of Germany ....... 3812347

[51] Int. Cl.⁵ .............................................. B60K 11/08
[52] U.S. Cl. ..................................... 180/68.6; 296/901
[58] Field of Search ....................... 180/68.6; 296/901; 293/120; 411/511; 403/277

[56] References Cited

U.S. PATENT DOCUMENTS

| | | | |
|---|---|---|---|
| 4,354,566 | 10/1982 | Yuda | 180/68.6 |
| 4,482,180 | 11/1984 | Huber et al. | 293/120 |
| 4,652,036 | 3/1987 | Okamoto et al. | 296/901 |

FOREIGN PATENT DOCUMENTS

| | | | |
|---|---|---|---|
| 2355972 | 5/1974 | Fed. Rep. of Germany | 180/68.6 |
| 0031845 | 3/1981 | Japan | 180/68.6 |
| 0031846 | 3/1981 | Japan | 180/68.6 |
| 8200808 | 3/1982 | World Int. Prop. O. | 296/901 |

*Primary Examiner*—David M. Mitchell
*Attorney, Agent, or Firm*—Evenson, Wands, Edwards, Lenahan & McKeown

[57] ABSTRACT

A motor vehicle has a covering part which is held in position at an adjacent body part by means of snap connections, each snap connection comprising a snap hook which engages in an assigned recess. In order to provide a cost-effective fastening of a covering part at an adjacent exterior part, with an easy mounting and a simple construction, the covering part, which is made of plastic, is fastened without any additional fastening elements at the body part, which is also made of plastic, snap hooks being locally molded to the body part, which engage in recesses of the fitted-on covering part.

9 Claims, 2 Drawing Sheets

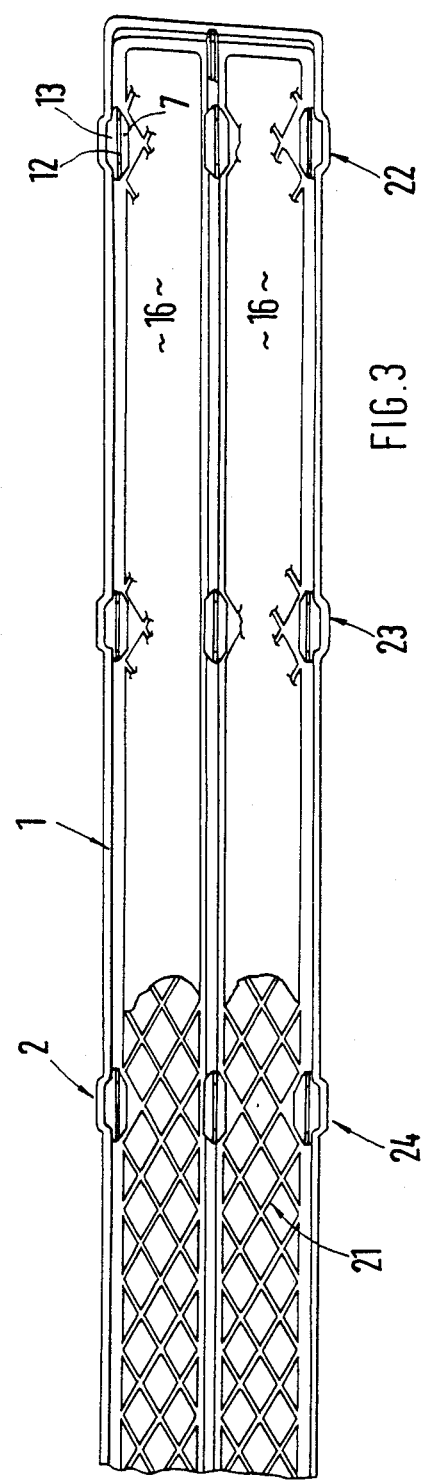
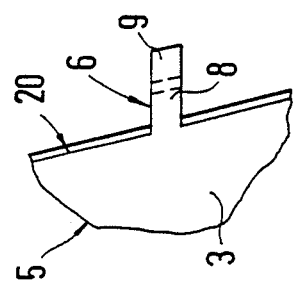

MOTOR VEHICLE HAVING A COVERING PART

BACKGROUND AND SUMMARY OF THE INVENTION

The present invention generally relates to a motor vehicle having a covering part which is held in position at an adjacent body part by snap connections.

In a motor vehicle as disclosed in U.S. Pat. No. 4 354 566, a covering part is held in position at the body by an additional fastening element. The fastening element, on the one side, is fixed at the body part by means of a clips connection and, on the other side, has snap hooks which engage in recesses of the covering part.

This arrangement has the disadvantage that, as a result of the separate fastening elements, the mounting and fastening of the covering part is expensive. Since the recesses for the snap hooks have a much larger height than the base sections of the snap hooks, it may happen that, as a result of the aging of the plastic material, rattling noises occur between the fastening element and the covering part.

Thus it is an object of the present invention to provide a cost-effective fastening of a covering part at an adjacent part of the body, with an easy mounting and a simple construction.

It is a further object of the present invention to provide a long-term secure rattle-free connection which is provided between the covering part and the body part.

According to certain preferred embodiments of the present invention, these and other objects are achieved by fastening the cover part to the body part by snap hooks, molded on the body part, which engage recesses of the cover part without the need for any additional fastening elements. Other characteristics, which develop the invention advantageously, will be evident as the present description proceeds.

The main advantages achieved by the present invention are that, by means of the direct fastening of the covering part at the body part, the mounting is facilitated considerably and the costs are reduced by the absence of the requirement of the additional fastening element. The elastically flexible web, which delimits the recess, ensures an easy mounting and a secure rattle-free seat of the covering part.

Other objects, advantages and novel features of the present invention will become apparent from the following detailed description of the invention when considered in conjunction with the accompanying drawings.

BRIEF DESCRIPTION OF THE DRAWINGS

FIG. 3 is a scaled-down partial view of the covering part in the direction of the arrow S of FIG. 1; and FIG. 4 is a partial view in the direction of the arrow T of FIG. 1.

DETAILED DESCRIPTION OF THE DRAWINGS

Figure 1:
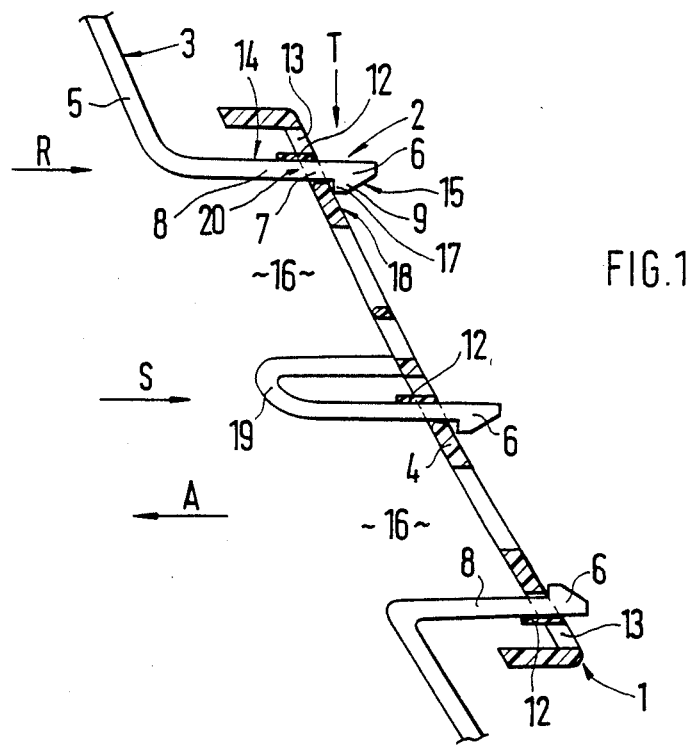
FIG. 1 is a vertical sectional view of a covering part and a body part of a motor vehicle constructed in accordance with a preferred embodiment of the present invention.

An embodiment of the invention is shown in the drawing and will be explained in detail in the following.

In FIG. 1, a covering part 1 for a motor vehicle is shown, which is made of plastic and is held in its position at an adjacent body part 3 by several snap connections 2. In the embodiment illustrated in FIG. 1, the covering part 1 is formed by an air inlet grid 4 arranged on the front end. The body part 3, according to FIG. 1, is represented as a front-end covering 5 which is manufactured of an elastic material, such as a fiber-glass reinforced plastic or the like.

A simple and cost-effective fastening of the covering part 1 is achieved in that the latter is fastened at the body part 3 without any additional fastening elements (clamps, screws or the like). Each snap connection 2 comprises a snap hook 6, which is injection-molded onto the body part 3 and engages in an assigned recess 7 of the fitted-on covering part 1. The snap hooks 6, which are preferably constructed in one piece with the body part 3, are aligned approximately horizontally and extend away from the body part 3 against the forward driving direction A. Each snap hook 6 comprises a base section 8 and a snap head 9, the snap head 9 having a larger height than the base section 8.

Figure 2:
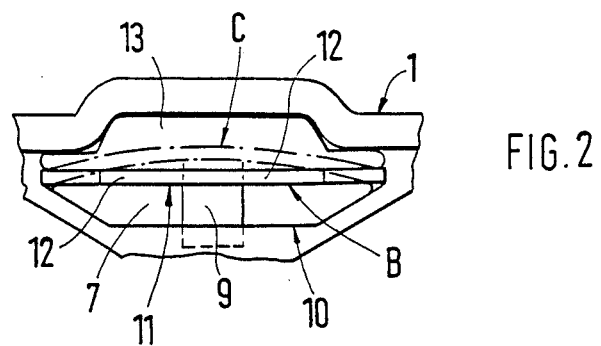
FIG. 2 is an enlarged partial view in the direction of the arrow R of FIG. 1.

The recess 7 at the covering part 1 has an approximately trapezoidal shape, generally indicated by reference numeral 10 as best seen in FIG. 2, the longer one of the horizontally aligned sides 11 of the trapezoid extending adjacently to an elastically flexible web 12 of the covering part 1.

The recess 7 has a much larger width than the snap head 9, so that different linear dimensions of the covering part 1 and the body part 3 can be compensated. The elastically flexible web 12 extends between the recess 7 accommodating the snap hook 6 and an adjacently arranged longitudinal slot 13. The longitudinal slot 13, in a central area of its transverse course, has a larger height than in the laterally exterior edge areas. The web 12 is provided above the flatly constructed outer surface 14 of the snap hook 6 and, viewed in vertical direction, is constructed to be relatively thin-walled. During the mounting of the covering part 1, the web 12 can be moved from an approximately horizontally extending inoperative position, generally indicated at B, into an installed position, generally indicated at C, which is bent toward the outside and is shown by a dash-dotted line in FIG. 2. After the guiding-through of the snap head 9, the web 12 returns to its inoperative position B. The recess 7 has a slightly larger height than the base section 8 of the snap hook 6 (snug fit), whereas the snap head 9 has a larger height than the recess 7.

A diagonally extending stop face, generally indicated at 15 in FIG. 1, provided at the snap head 9 facilitates the introducing of the snap hook 6 into the recesses 7. The snap heads 9 are provided only in the area of the fastening points for the covering part 1, whereas the base sections 8 of the snap hooks 6 extend over the whole width of the body part 3 and form two air guiding ducts 16 at the body part 3 which are disposed above one another. In the area of the covering part 1, the air guiding ducts 16 have a wide-meshed grid structure 21 as best seen in FIG. 3.

For the relatively large-surface covering part 1, several snap connections 2 are provided, which are arranged next to one another and above one another.

According to FIG. 1, the snap heads 9 project beyond the covering part 1 toward the rear, a step-shaped shoulder 17 of the snap head 9 supporting itself at the rear side 18 of the covering part 1. The body part 3 has two air guiding ducts 16 located above one another, which are delimited by the exterior horizontal base sections 8 of the snap hooks 6 and an approximately U-shaped center web 19. The snap hooks 6 are arranged to be invisible from the exterior side of the vehicle.

The covering part 1 is placed on the body part 3 from the rear. Viewed in longitudinal direction of the vehicle, the covering part is fixed by the snap head 9 and diagonally extending wall sections at 20 of the body part 3, the diagonally extending wall sections 20 being arranged on the side of the body part 3 which is opposite the step-shaped shoulders 17. According to FIG. 2, three snap connections 2 respectively, which are arranged above one another, are provided at the covering part 1 at 22, 23 and 24.

Although the present invention has been described and illustrated in detail, it is to be clearly understood that the same is by way of illustration and example only, and is not to be taken by way of limitation. The spirit and scope of the Present invention are to be limited only by the terms of the appended claims.

What is claimed:

1. A motor vehicle having a covering part, which is held in position at an adjacent body part by means of snap connections, each snap connection comprising a snap hook which engages in an assigned recess, wherein the covering part is fastened at the body part without any additional fastening elements, snap hooks being integrally formed with the body part, which engage in recesses of the fitted-on covering part;
wherein an approximately horizontally aligned edge of the recess if formed by an elastically flexible web, said recess extending in a vertical plane, said web extending across the recess accommodating the snap hook and defining a slot opening extending adjacently to said web.

2. A motor vehicle according to claim 1, wherein the web extends adjacently to a flat outer surface of the snap hook.

3. A motor vehicle according to claim 1, wherein the web, during mounting of the covering part, by means of a snap head of the snap hook, is pressed vertically into an installed position (C), and wherein, after the snap head is guided through, the web returns to its original position (B).

4. A motor vehicle according to claim 1, wherein the web, viewed in a vertical direction, is thin-walled.

5. A motor vehicle according to claim 1, wherein the recess at the covering part has a much larger width than the snap hook molded to the body part.

6. A motor vehicle according to claim 1, wherein the cover part and the body part are made of a plastic material.

7. A motor vehicle having a covering part, which is held in position at an adjacent body part by means of snap connections, each snap connection comprising a snap hook which engages in an assigned recess, wherein the covering part is fastened at the body part without any additional fastening elements, snap hooks being integrally formed with the body part, which engage in recesses of the fitted-on covering part, said recess extending in a vertical plane;
wherein a height of the recess in the vertical plane is slightly larger than the height of a base section of the snap hook, whereas a snap head of the snap hook has a larger height than the recess.

8. A motor vehicle according to claim 1, wherein a diagonally extending stop face is provided at he snap head.

9. A motor vehicle having a covering part, which is held in position at an adjacent body part by means of snap connections, each snap connection comprising a snap hook which engages in an assigned recess, wherein the covering part is fastened at the body part without any additional fastening elements, snap hooks being integrally formed with the body part, which engage in recesses of the fitted-on covering part;
wherein said recess extends in a vertical plane and further comprising a web that extends horizontally in aid recess, the web, during mounting of the covering part, by means of a snap head of the snap hook, is pressed vertically into an installed position (C), and wherein, after the snap head is guided through, the web returns to its original position (B).

* * * * *